(12) United States Patent
Bruns (10) Patent No.: US 6,835,002 B2
(45) Date of Patent: Dec. 28, 2004

(54) APPARATUS AND METHOD FOR ALIGNING FIBER ARRAYS

(75) Inventor: Donald Bruns, San Diego, CA (US)

(73) Assignee: Trey Enterprises Corp., San Diego, CA (US)

( * ) Notice: Subject to any disclaimer, the term of this patent is extended or adjusted under 35 U.S.C. 154(b) by 0 days.

(21) Appl. No.: 09/834,731

(22) Filed: Apr. 13, 2001

(65) Prior Publication Data

US 2004/0042732 A1 Mar. 4, 2004

Related U.S. Application Data

(60) Provisional application No. 60/273,434, filed on Mar. 5, 2001.

(51) Int. Cl.[7] ................................................ G02B 6/36
(52) U.S. Cl. ........................................................ 385/80
(58) Field of Search ........................... 385/80, 83, 147; 439/82, 342

(56) References Cited

U.S. PATENT DOCUMENTS 4,426,123 A * 1/1984 Ritchie et al. .............. 439/368
5,880,590 A * 3/1999 Desai et al. ................. 324/757
6,345,916 B1 * 2/2002 Yui et al. ...................... 385/80
6,526,204 B1 * 2/2003 Sherrer et al. ................ 385/49

* cited by examiner

Primary Examiner—Khiem Nguyen
(74) Attorney, Agent, or Firm—Gary Eastman (57) ABSTRACT

A method of aligning fiber arrays includes the method steps of inserting optical fibers into a ferrule array with a predetermined portion of the fiber extending from the ferrule. The ends of the fibers are then inserted at least partially through a fiber alignment hole in a substrate. Once the fibers extend at least partially through the substrate, the substrate is then displaced in a direction perpendicular to the optical fiber to ensure contact between the end of the fiber and a corner formed on the inside edges of the fiber alignment holes in the substrate. Once the fiber is positioned, a bonding block may be attached to both the ferrule array and the substrate to maintain the positional relationship between them and to maintain the proper positioning of the fiber within the substrate.

12 Claims, 5 Drawing Sheets

APPARATUS AND METHOD FOR ALIGNING FIBER ARRAYS

RELATED APPLICATION

This application is a continuation in part of Provisional Application Ser. No. 60/273,434 entitled "Method of Aligning Fiber Arrays" filed Mar. 5, 2001.

FIELD OF THE INVENTION

The present invention relates generally to optical fibers. More specifically, the present invention pertains to methods of aligning optical fibers. The present invention is particularly, though not exclusively, useful for aligning optical fibers in a fixed array and locating those optical fibers with a high degree of precision.

BACKGROUND OF THE INVENTION

In optical systems having more than one optical fiber, it is often challenging to properly arrange the various optical fibers, and secure them in place. This challenge is further compounded in systems where the precise location of the core of each optical fiber must be known.

One such system is an optical cross connect switch. In an optical cross connect switch, it is necessary to precisely position both an input optical fiber and an output optical fiber in order for the fibers to transmit light efficiently between them. Because the diameter of the core of a typical optical fiber is five to ten microns (5–10 $\mu$m) it is necessary to position the ends of the optical fiber very precisely. In fact, it is advantageous to position the ends of the optical fiber such that the position of the core of the fiber is known to within one (1) or two (2) microns.

Accordingly, it is an object of the present invention to provide an apparatus and method for aligning optical fibers in a fixed array where the core of the optical fiber is located with a high degree of precision.

SUMMARY OF THE PRESENT INVENTION

The present invention provides for the manufacture of large arrays of optical fibers with a high degree of precision in the placement of the fibers, typically to within five (5) microns, or one-half of the diameter of the core of the typical fiber. This precision is adequate to enable a control system to acquire the position of the end of an optical fiber without the incorporation of a random, or regional, search for the position of the fiber.

The method of the present invention for creating an array of optical fibers includes at least three (3) steps. The first step includes arranging a number of glass ferrules into a two-dimensional array. Each ferrule is formed with a longitudinal bore sized to closely receive an optical fiber. The outside diameters of the ferules are very precise, and thus, the ferules may be placed in contact with one another to create a very precise two-dimensional ferrule array. These ferrules may be fixed together with an ultraviolet curing epoxy, for example, to provide a rigid array of ferrules, and to minimize any movement of the ferrules during the curing process.

Once the ferrules are arranged in a two-dimensional array and secured in place in the first step, step two begins with the optical fibers being inserted through the ferrules until the ends extend approximately five to ten millimeters (5–10 mm) from the end of the ferrules. The fibers are then fixed in position within the ferrules with ultraviolet curing epoxy, for example, or any other similar means for securing the optical fibers in place within the ferrule.

Once the optical fibers are properly positioned and secured in the ferrule array, a substrate formed with a corresponding array of precision fiber alignment holes is brought near the fiber array such that each optical fiber will extend at least partially into a fiber alignment hole. Each fiber alignment hole may be formed with at least one corner with a known location. Once positioned over the optical fibers, the substrate is then displaced, or offset, slightly in one or more directions to assure that the end portion of the optical fibers make contact with the inside edge of the alignment hole, preferably in the location of the corner. Because the alignment holes and specifically, the corner of each alignment hole, may be very precisely formed in the substrate, the location of the end of the optical fiber may be very precisely determined. The substrate and the fiber array may be fixed together using a bonding block and epoxy, for example, thereby maintaining their offset position and completing the assembly.

The resulting assembly provides for an easily manufacturable two-dimensional array of optical fibers where the precise location of the end of each optical fiber is controlled. In fact, because the corners of the alignment holes formed in the substrate may be very precisely located, the location of the core of each optical fiber is also precisely determined within the assembly to within a few microns.

DESCRIPTION OF THE DRAWINGS

The novel features of this invention, as well as the invention itself, both as to its structure and its operation, will be best understood from the accompanying drawings, taken in conjunction with the accompanying description, in which like reference characters refer to similar parts, and in which.

DETAILED DESCRIPTION OF A PREFERRED EMBODIMENT

Figure 1:
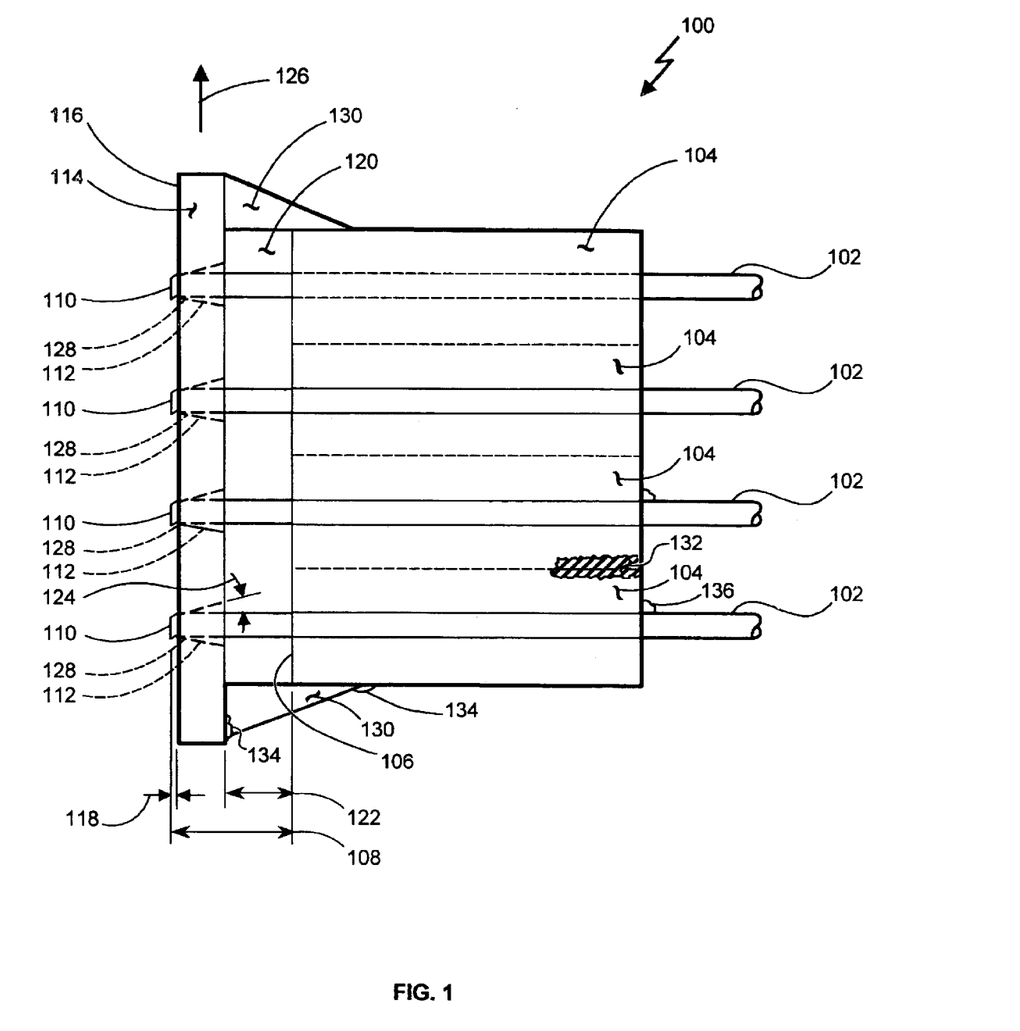
FIG. 1 is a side view of the preferred embodiment of the present invention showing the fibers extending through the ferrule array, across the gap and through the substrate.
Figure 2:
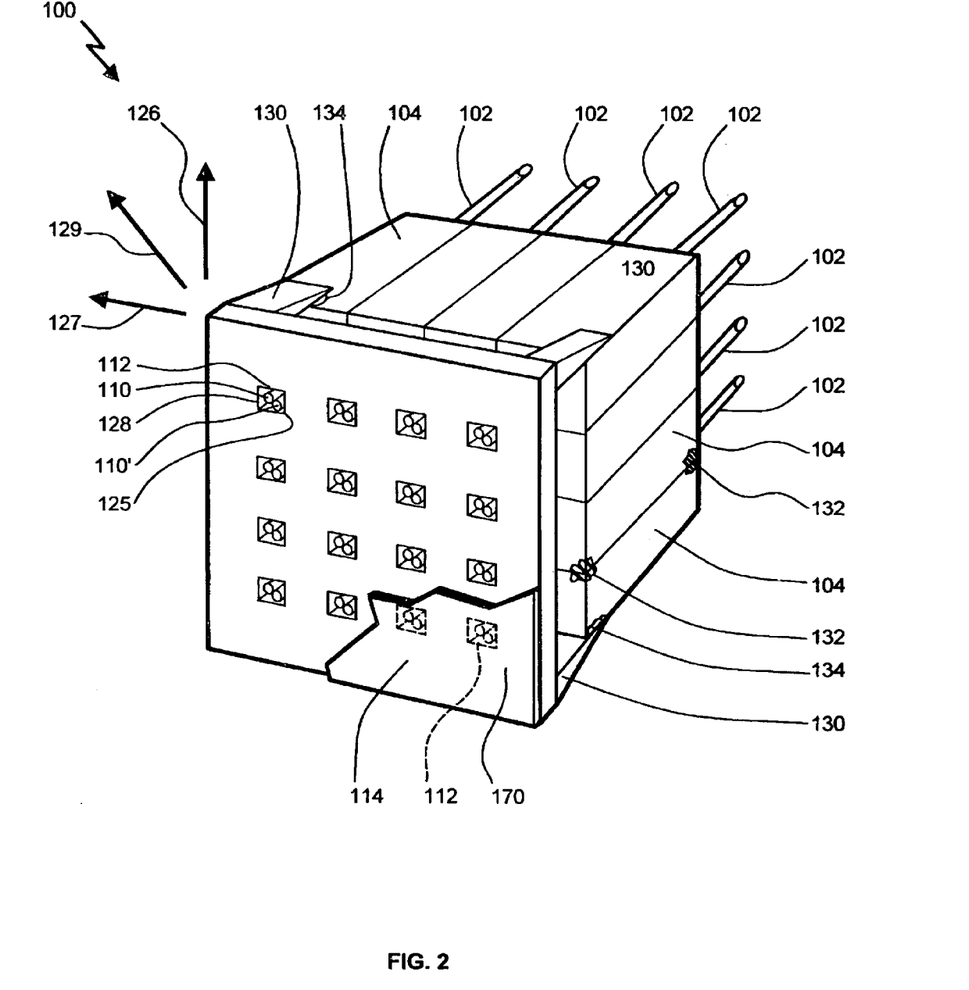
FIG. 2 is a perspective view of an apparatus incorporating the method of the present invention, and showing the precise location of the fiber ends in a corner of the fiber alignment hole after the substrate shifts in one or more directions to contact the fibers.

Referring initially to FIGS. 1 and 2, a preferred embodiment of an apparatus for use of the Method of Aligning Fiber Arrays of the present invention is shown and generally designated 100. Apparatus 100 includes a number of optical fibers 102, with each fiber 102 extending longitudinally through a ferrule 104 and protruding from front face 106 of ferrule 104 a distance 108. As shown, each end 110 of fibers 102 is inserted into a corresponding fiber alignment hole 112 formed in substrate 114 such that the fibers 102 extend past the face 116 of substrate 114 a distance 118.

Depending on the length of distance 108, a gap 120 having a distance 122 may be created between the ferrules 104 and the substrate 114. This gap 120 provides for the slight movement of the optical fiber 102 due to the flexible nature of the fiber itself. While this flexible nature may facilitate the movement and routing of the optical fiber, it also makes locating the end 110 of the fiber 102 difficult.

In order to facilitate the insertion of fibers 102 into the fiber alignment holes 112 in substrate 114, the fiber alignment holes 112 may be formed with an angle 124 which, as shown, tapers toward the face 116 of substrate 114. This angle 124 may range from 0 to 45 degrees, and provides for a larger acceptance area of fiber alignment hole 112, yet provides for a smaller hole size on the face 116 of the substrate 114.

Once the fibers 102 are positioned at least partially through fiber alignment holes 112 in substrate 114, the substrate is moved in direction 126 such that the ends 110 of fibers 102 contact the inside edge 128 of fiber alignment hole 112. Once contact is made between end 110 of fiber 102 and the inside edge 128 of the alignment hole 112, the precise location of the end 110 of fiber 102 relative to the substrate 114 is known.

Since fiber alignment hole 112 may be formed with a corner 125 (shown in FIG. 2), the end 110 of fiber 102 may be positioned into the corner 125 which provides a two-dimensional alignment edge 128, further stabilizing the position of fiber 102 into a known position within the fiber alignment hole 112. Once contact is made between the fiber 102 and substrate 114, bonding blocks 130 may be installed to maintain the relationship between the array of ferrules 104 and the substrate 114, thereby maintaining the proper positioning of the ends 110 of fibers 102. Ferrules 104 may be held together in a two-dimensional array using an epoxy 132, such as an ultraviolet (UV) adhesive which hardens when exposed to ultraviolet radiation. Also, bonding blocks 130 may be attached to both the array of ferrules 104 and substrate 114 with an adhesive 134, such as an ultraviolet (UV) curing adhesive. Also, each fiber 102 may be held in place within ferrule 104 with epoxy 136, thereby preventing the movement of the fiber 102 within the ferrule 104. A small amount of epoxy may also be inserted into each fiber alignment hole 112 to hold end 110 of fibers 102 in place relative to substrate 114.

A typical ferrule 104 is formed with a nozzle end (not shown) which tapers from a larger opening for insertion of the fiber 102, to a smaller opening sized to closely receive the fiber end 110. It is to be appreciated that a small amount of epoxy may be inserted into the nozzle end of the ferrule 104 to secure the optical fiber 102 securely in the ferrule.

Ultraviolet curing adhesive is of particular advantage in this apparatus due to the ability to apply adhesive and accurately position the ferrules, substrates, and bonding blocks. These ferrules are typically made of a translucent material. This translucency provides that once in position, the adhesive between the ferrules may be exposed to ultraviolet light, thereby curing the adhesive without any change in position.

Method of the Present Invention

Figure 3:
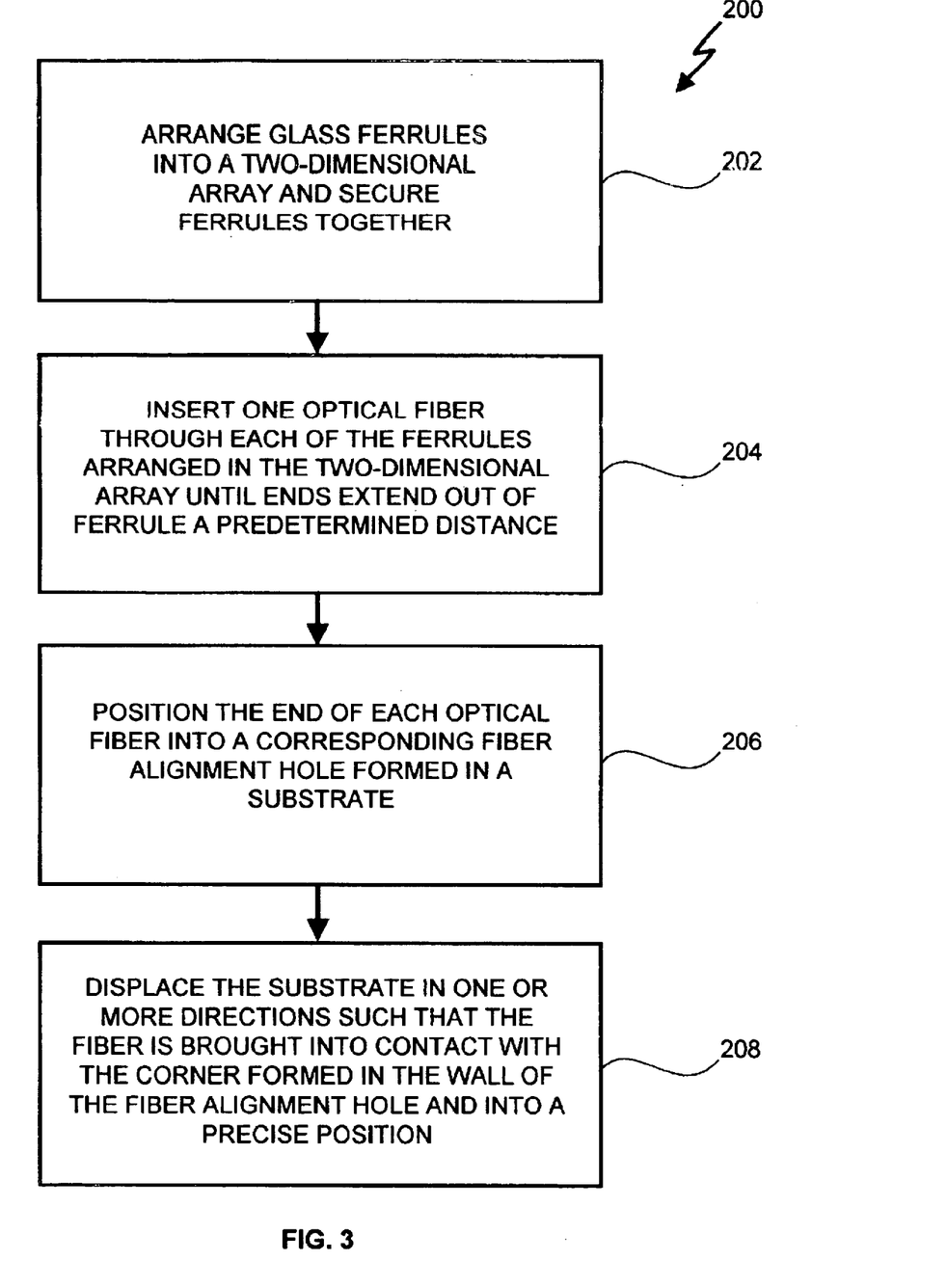
FIG. 3 is a flow chart representing the steps of the present invention, including the arrangement of ferrules, the insertion of optical fibers into the ferrules and into the fiber alignment holes formed in the substrate, and the displacement of the substrate such that the fibers contact the corner formed on the inside edge of the fiber alignment hole in the substrate for precise positioning.

The method of the present invention is perhaps best understood with reference to FIGS. 1 and 2 which show a corresponding apparatus of the present invention. FIG. 3 includes a method flowchart generally designated 200, and includes four (4) steps 202, 204, 206 and 208. Method 200 begins with first step 202 in which a number of glass ferrules 104 are arranged in a two-dimensional array, such as the 4×4 array shown in FIG. 2. Once arranged, the ferrules 104 are secured together to create a fixed ferrule array. In a preferred embodiment, the ferrules are attached together using an ultraviolet curing adhesive 132.

Once the two-dimensional array of ferrules 104 is created in step 202, one optical fiber 102 is inserted through each ferrule 104 in step 204. The end 110 of each fiber 102 is positioned to extend from the face 106 of ferrule 104 a distance 108. In a preferred embodiment, distance 108 ranges from five to ten millimeters (5–10 mm) preferably approximately seven millimeters (7 mm), however, it is to be appreciated that distance 108 may be more or less, and may vary depending on the distance 122 of gap 120.

To facilitate the proper positioning of fibers 102 in ferrules 104, a reference plate (not shown) may be used to provide for a consistent extension distance 108. In use, a reference plate may be placed a predetermined distance 108 away from face 106 of ferrule 104 to stop the further advancement of fiber 102 through ferrule 104 as fiber 102 is inserted into the ferrule 104.

Following the insertion of each fiber 102 through a corresponding ferrule 104, the end 110 of each fiber 102 is inserted through a fiber alignment hole 112 in substrate 114 in step 206. As discussed above, the fiber alignment holes 112 may be tapered, or have an angle 124, to facilitate the insertion of the fibers 102 into the fiber alignment holes 112. In a preferred embodiment, end 110 of fiber 102 extends past the face 116 of substrate 114 a distance 118.

Distance 118 can vary depending upon the particular apparatus. In some configurations, the end 110 of fiber 102 may extend from face 116 of substrate 114, while in other configurations, the end 110 of fiber 102 may be recessed slightly within the fiber alignment hole 112. In a case where the fiber 102 is recessed within the fiber alignment hole, e.g. when distance 118 is less than or equal to zero, it is important that the taper angle 124 is sufficiently small to ensure end 110 of the fiber 102 may be exposed to an incoming light signal (not shown), such as is necessary in an optical interconnect system. Regardless of the configuration, the precise location of end 110 of fiber 102 against edge 128 and corner 125 within the fiber alignment hole 112 in substrate 114 is known.

As shown in step 208, once the end 110 of fibers 102 are inserted into the fiber alignment holes 112 in step 206, the substrate 116 is displaced in at least one direction, for example direction 126, such that the end 110 of fiber 102 contacts the corner 125 of inside edge 128 of fiber alignment holes 112. Because fiber alignment holes 112 may be formed in substrate 114 to a very high degree of precision, positioning the optical fiber 102 against the corner 125 formed on the inside edge 128 of the fiber alignment hole 112 allows for the very precise location of end 110 of fiber 102.

As shown in FIG. 2, the displacement of substrate 114 may be in direction 126, 127 or a combination of 126 and 127 into direction 129. Preferably, movements 126, 127, and 129 are in a plane substantially perpendicular to fiber 102, and cause the end 110 of fiber 102 to be brought into contact with corner 125 of inside edge 128 of fiber alignment hole 112, resulting in the very precise positioning of end 110 of fiber 102. It is also to be appreciated that due to the flexible nature of fibers 102, some fibers may contact edge 128 before others. However, since the fibers 102 are flexible and extend from ferrule 104 a distance 108, those contacting edge 128 first bend slightly as the substrate continues to move in directions 126, 127 and/or 129, until all fibers 102 are positioned against edge 128. Thus, even if fibers 102 are originally in different positions relative to its fiber alignment hole 112 in substrate 114, once the substrate 114 is offset, all fibers 102 are properly positioned in corners 125 of fiber alignment holes 112.

Once the substrate 114 is displaced and the fibers 102 are properly positioned within the fiber alignment holes 112 in the substrate 114, bonding blocks 130 may be attached to both the two-dimensional array of ferrules 104 and to substrate 114 to keep substrate 114 from moving relative to the ferrules 104. Adhesive 134 may be applied to bonding blocks 130 in order to maintain the relative position between substrate 114 and ferrules 104. This enables the free movement of the combined apparatus, including the ferrules 104 and substrate 114, while maintaining the precise position of the ends 110 of fibers 102 within the fiber alignment holes 112. In this manner, the combined apparatus may be assembled and then installed into another apparatus, such as an optical cross connect, while maintaining the precise position of the ends 110 of fibers 102 relative to the substrate 114.

Referring to FIG. 2, the fiber alignment holes 112 are shown to have a square opening. It should be appreciated that the selection of a square fiber alignment hole 112 is merely exemplary, and that the opening may have virtually any shape so long as the fiber may be precisely positioned against the corner 125 of inside edge 128 of fiber alignment hole 112 when the substrate is moved in direction 126, 127 or 129. Also, it should be appreciated that although the shape of ferrule 104' has been shown as having a square cross-section, ferrules 104 may also be formed having a circular, hexagonal, or any other cross-section shapes. The methods described in this invention apply to all ferrule shapes known in the art, including those having square, rectangular, and circular cross-sections.

The arrangement of ferrules 104 in the array of ferrules are shown in FIG. 2 as a 4×4 array. However, it should be appreciated that the arrangement of ferrules 104 shown in FIG. 2 is merely exemplary, and that ferrules 104 may be arranged in a square, rectangular, hexagonal, or circular configuration, and may be expanded to accommodate any number of optical fibers 102, such as a 10×10, 16×16, 100×100, 10×16, or any other configuration of ferrules.

From viewing FIG. 2, the positioning of ends 110 of fibers 102 within the fiber alignment holes 112 is shown. The original position of fibers 102 are shown in dashed lines to demonstrate their location prior to shifts in substrate 114. Initially, when fiber 102 is inserted into fiber alignment hole 112, the end 110 will rest somewhere in an original position (shown in dashed lines) within fiber alignment hole 112. However, once substrate 114 is moved in directions 126, 127, or in combined direction 129, end 110 of fiber 102 moves to position 110' and contacts inside edge 128 of fiber alignment hole 112, and is ultimately positioned in corner 125. Once positioned against the corner 125 of inside edge 128 of fiber alignment hole 112, the location of end 110 of fiber 102 is precisely known, thereby facilitating the focussing of a light source into the core of the fiber 102.

Figure 4:
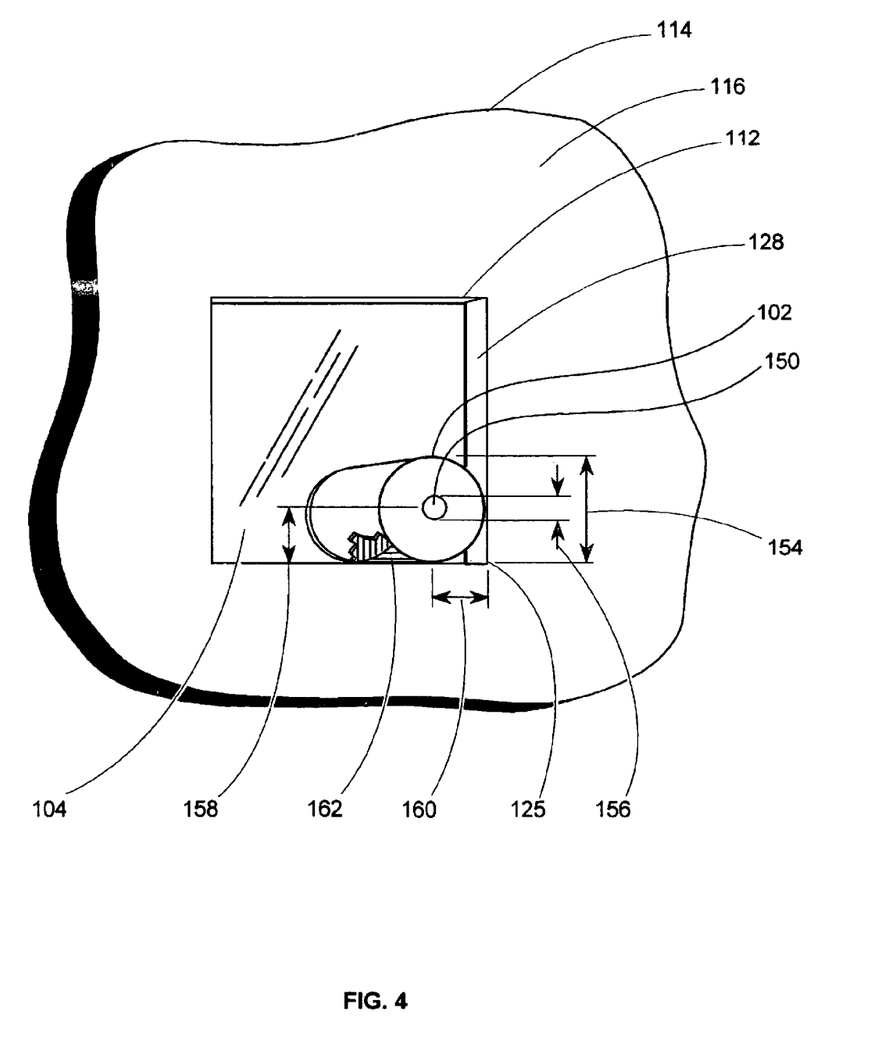
FIG. 4 is a detailed drawing of a portion of the apparatus of the present invention showing the substrate and a single fiber alignment hole that has an inside edge formed with at least one corner, and a fiber precisely positioned in the corner of the fiber alignment hole.

Referring to FIG. 4, a detailed portion of the apparatus of the present invention is shown. Substrate 114 is formed with fiber alignment hole 112 having an inside edge 128, and at least one corner 125. As fiber 102 is positioned in fiber alignment hole 112 and the substrate is moved in direction 129 (shown in FIG. 2), fiber 102 becomes precisely positioned in corner 125.

Fiber 102 has a diameter 154 of approximately 120 microns (120 $\mu$m) with a core 150 with a diameter 156. The diameter 156 of the core 150 of a single mode (SM) fiber 102 typically ranges from five to ten microns (5–10 $\mu$m). Due to the close tolerances of the dimensions of fiber 102, the location of the core 150 relative to corner 125 is known. More specifically, when end 110 of fiber 102 is positioned in corner 125, the core 150 is located an x-distance 158 and a y-distance 160 from corner 125. If fiber 102 is a typical fiber having a diameter 154 of 120 microns (120 $\mu$m), then x-distance 158 and y-distance 160 are each equal to one-half (½) of the diameter 154, or sixty microns (60 $\mu$m).

The external diameter 154 and the location and diameter of the core 150 of fiber 102 is measurable and a known specification of commercial fiber. Thus, the location of the core 150 with respect to corner 125 of the fiber alignment hole 112 for virtually any fiber 102 may be identified simply by knowing the diameter of the fiber.

As mentioned above, the diameter of the core 150 of fiber 102 is typically five to ten (5–10) microns. Since the location of corner 125 of fiber alignment hole 112 in substrate 114 may be identified to within one or two microns, the precise location of core 150 in end 110 of fiber 102 may also be determined to within five (5) microns, or less, using the method of the present invention. In optical communication systems where optical signals must be very precisely aligned with the core 150 of an optical fiber 102, the present invention provides a solution to the challenges of accurately positioning the flexible fibers 102 to ensure maximum collection of the light signal into core 150.

FIG. 4 also details an example of how fiber 102 may be secured in place within fiber alignment hole 112. For example, once fiber 102 is positioned in corner 125, a small amount of epoxy 162 may be placed between the fiber 102 and the edge 128 of fiber alignment hole 112. In this manner, once fiber 102 has been properly positioned within alignment hole 112, it may be secured in place to minimize any effects of handling or vibration in the manufacturing of the optical system in which the apparatus of the present invention is being utilized. While only a small amount of epoxy 162 has been shown in FIG. 4, it is to be appreciated that epoxy 162 may completely fill fiber alignment hole 112, may be placed on face 116 of substrate 114, or any other location where the epoxy 162 could contact both fiber 102 and a portion of substrate 114.

Figure 5:
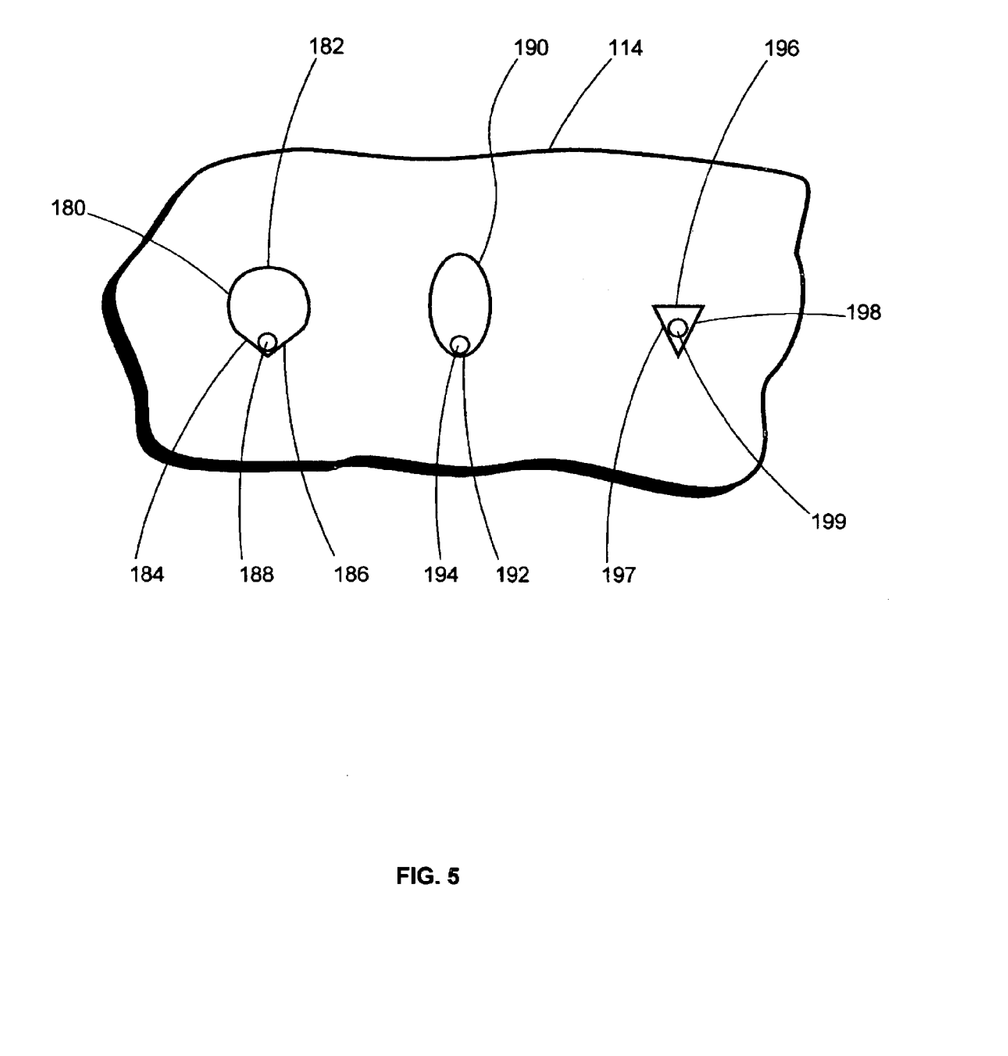
FIG. 5 is a substrate formed with fiber alignment holes having a variety of shapes demonstrating some of the shapes suitable for the present invention.

Referring now to FIG. 5, a substrate 114 is shown formed with a variety of fiber alignment holes 182, 190, and 196, each having a variety of shapes. Alignment hole 182 has a circular portion 180 and an angled portion including two flat walls 184 and 186. In this embodiment, fiber 188 can be uniquely positioned between flat walls 184 and 186 such that the position of fiber 188 may be very accurately determined.

Similarly, fiber alignment hole 190 is oval shaped with the fiber 194 resting in the lower-most curve 192. In use, this fiber alignment hole 190 would be appropriate where fiber 194 has a diameter causing fiber 194 to position itself along the axis of the oval, and where the sides of the fiber alignment hole 190 formed in the substrate 114 are smooth.

Fiber alignment hole 196 is triangularly shaped, and include two flat walls 197 and 198 which contact fiber 199 and accurately position the fiber at a known position within the fiber alignment hole 196. While a number of configurations and shapes for fiber alignment holes have been shown and discussed, it should be appreciated that these examples are merely exemplary of preferred embodiments. No limitation as the shape of fiber alignment hole is intended by these examples, rather, any shape fiber alignment hole which provides for a known position of a fiber is fully contemplated herein.

Alternative Methods

In an alternative embodiment to method 200, substrate 114 may be first attached to the ferrules 104, and then fibers 102 may be inserted into the combined assembly and then fixed in place. As the fibers 102 are inserted through the ferrules 104 and fiber alignment holes in substrate 114, ends 110 may bend slightly as they contact the inside edge 128 of fiber alignment holes 112. Due to the fragile nature of the optical fibers 102, this process must be done carefully in order to prevent damage to ends 110 fibers 102, or to the precisely formed inside edge 128 of fiber alignment holes 112.

In many fiber optic systems, it is necessary for ends 110 of fibers 102 to be polished. In one embodiment of the present invention, the ends 110 of fibers 102 may be polished prior to insertion into the ferrules 104. Alternatively, fibers 102 may be inserted into ferrules 104 with unfinished, or unpolished, ends 110. Then, once properly positioned in ferrules 104, the ends 110 of all fibers 102 may be polished simultaneously. In such a method, a temporary potting compound 170 (shown in FIG. 2) would be required to hold the fibers 102 in place while the polishing takes place. This temporary potting compound may be a seven millimeter (7 mm) thick layer of pitch or sealing wax or epoxy. Then, after the ends 110 of fibers 102 have been polished, the wax, pitch or epoxy could be melted or dissolved away, leaving the polished ends 110 of fiber 102 extending seven millimeters (7 mm) from the face 106 out of ferrule 104.

In another alternative method, ends 110 of fibers 102 may be polished without the use of a temporary potting compound 170. For example, once the ends 110 of fibers 102 are positioned in corners 125 of fiber alignment holes 112, each fiber 102 may be polished in a direction opposite to direction 129. In this manner, the polishing material (not shown), such as a polishing cloth, may be drawn across face 116 of substrate 114 in a direction opposite direction 129 which pushes fiber 102 firmly into corner 125, while simultaneously contacting the ends of each fiber 102 extending through substrate 114. Thus, the end 110 of each fiber 102 which extends through fiber alignment hole 112 may be polished simultaneously, without the need for any temporary potting material 170 or any other mechanism for retaining the fibers 102 in place during the polishing process.

While the apparatus for, and method of, aligning fiber arrays of the present invention as herein shown and disclosed in detail is fully capable of obtaining the objects and providing the advantages herein before stated, it is to be understood that it is merely illustrative of preferred embodiments of the invention and that no limitations are intended to the details of the method, construction or design herein shown other than as described in the appended claims.

I claim:

1. In an apparatus comprising a two-dimensional array of ferrules formed with a longitudinal bore and wherein an optical fiber passes through said bore of each of said ferrules and the end of the optical fiber extends from the face of said ferrule a predetermined distance and into a fiber alignment hole formed in a substrate and having an inside edge formed with at least one corner, a method of aligning fiber arrays, comprising the steps of:

arranging two or more ferrules into a two-dimensional array;

securing said two or more glass ferrules together to form an array of ferrules;

inserting an optical fiber through said bore of each of said two or more ferrules until the end of said optical fiber extends from said ferrule a predetermined distance;

positioning said end of each said optical fiber into a corresponding fiber alignment hole formed in a substrate; and displacing said substrate in one or more directions such that the end of the fiber contacts the corner formed on the inside edge of the fiber alignment hole.

2. The method of claim 1, further comprising:

securing said substrate to said array of ferrules.

3. The method of claim 2 wherein securing said substrate to said array of ferrules further comprises:

attaching a bonding block to both said substrate and said array of ferrules.

4. The method of claim 1, wherein displacing said substrate in one or more directions such that the end of the fiber contacts the corner formed on the inside edge of the fiber alignment hole further comprises moving said substrate in a plane substantially perpendicular to said optical fiber.

5. The method of claim 1, wherein securing said two or more glass ferrules together to form an array of ferrules further comprises:

applying an epoxy to said ferrules and holding said ferrules in a two-dimensional array; and exposing said epoxy to ultraviolet radiation until said epoxy is cured.

6. The method of claim 1, wherein said predetermined distance is in the range of five to ten millimeters (5–10 mm).

7. The method of claim 1, further comprising:

securing each said optical fiber in said ferrule.

8. The method of claim 7, wherein securing each said optical fiber in said ferrule further comprises:

applying ultraviolet epoxy to each said optical fiber; and exposing said epoxy to ultraviolet radiation to cure said epoxy.

9. The method of claim 1, further comprising polishing said end of each said optical fiber.

10. The method of claim 1, wherein inserting one optical fiber through each of said two or more ferrules until the end of said optical fiber extends from said ferrule a predetermined distance further comprises:

positioning a reference plate a said predetermined distance from said array of ferrules and extending each fiber from said ferrule until it contacts said reference plate.

11. The method of claim 10, wherein said predetermined distance is seven millimeters (7 mm).

12. The method of claim 1, further comprising forming an array of fiber alignment holes in a substrate, wherein said the corner of each said fiber alignment hole is precisely located; and wherein the location of each said optical fiber may be determined within said fiber alignment hole.

* * * * *

UNITED STATES PATENT AND TRADEMARK OFFICE
CERTIFICATE OF CORRECTION

PATENT NO. : 6,835,002 B2
APPLICATION NO. : 09/834731
DATED : December 28, 2004
INVENTOR(S) : Bruns It is certified that error appears in the above-identified patent and that said Letters Patent is hereby corrected as shown below:

Col. 1, Line 8, add the following

STATEMENT REGARDING FEDERALLY SPONSORED RESEARCH OR DEVELOPMENT

This invention was made with Government support under contract DASG60-00-C-0101 awarded by U.S. Army Space and Missile Defense Command. The Government has certain rights in the invention.

Signed and Sealed this

Fourteenth Day of August, 2007

JON W. DUDAS
*Director of the United States Patent and Trademark Office*